(12) United States Patent
Robb

(10) Patent No.: US 10,515,101 B2
(45) Date of Patent: Dec. 24, 2019

(54) DETERMINING CLUSTERS OF SIMILAR ACTIVITIES

(71) Applicant: Strava, Inc., San Francisco, CA (US)

(72) Inventor: Drew Robb, San Francsico, CA (US)

(73) Assignee: Strava, Inc., San Francisco, CA (US)

( * ) Notice: Subject to any disclaimer, the term of this patent is extended or adjusted under 35 U.S.C. 154(b) by 205 days.

(21) Appl. No.: 15/483,180

(22) Filed: Apr. 10, 2017

(65) Prior Publication Data

US 2017/0300566 A1 Oct. 19, 2017

Related U.S. Application Data

(60) Provisional application No. 62/324,819, filed on Apr. 19, 2016.

(51) Int. Cl.
*G06F 16/29* (2019.01)
*G06F 16/909* (2019.01)

(52) U.S. Cl.
CPC ............ *G06F 16/29* (2019.01); *G06F 16/909* (2019.01)

(58) Field of Classification Search
CPC .... G06F 16/29; G06F 16/35; G06F 17/30241; G06F 17/30705; G06F 17/3071; G06F 17/30713; G06F 16/906; G06F 16/909
See application file for complete search history.

(56) References Cited

U.S. PATENT DOCUMENTS

| | | | | |
|---|---|---|---|---|
| 6,289,354 | B1* | 9/2001 | Aggarwal | G06F 17/30327 |
| 2004/0158562 | A1* | 8/2004 | Caulfield | G06F 16/215 |
| 2013/0041590 | A1* | 2/2013 | Burich | G06F 19/3418 |
| | | | | 702/19 |
| 2013/0184007 | A1* | 7/2013 | Hategan | G06Q 30/0259 |
| | | | | 455/456.1 |
| 2014/0039840 | A1* | 2/2014 | Yuen | A61B 5/6838 |
| | | | | 702/189 |
| 2014/0164611 | A1* | 6/2014 | Molettiere | A61B 5/1112 |
| | | | | 709/224 |
| 2014/0274022 | A1* | 9/2014 | Bell | G06Q 30/0282 |
| | | | | 455/418 |
| 2015/0262397 | A1* | 9/2015 | Eastman | G01C 21/32 |
| | | | | 345/440 |
| 2015/0347562 | A1* | 12/2015 | Guedalia | H04W 4/21 |
| | | | | 707/739 |
| 2017/0011040 | A1* | 1/2017 | Eastman | G06Q 10/02 |

OTHER PUBLICATIONS

Author Unknown, Geohash, Wikipedia, Mar. 30, 2017, https://web-beta.archive.org/web/20160413113313/https://en.wikipedia.org/wiki/Geohash.

* cited by examiner

*Primary Examiner* — James E Richardson
(74) *Attorney, Agent, or Firm* — Van Pelt, Yi & James LLP

(57) ABSTRACT

Determining clusters of similar activities is disclosed, including: receiving a plurality of activities, wherein an activity included in the plurality of activities includes GPS data recorded using a GPS recording device; determining a cluster of similar activities from the plurality of activities; and generating a map display for the cluster of similar activities.

20 Claims, 9 Drawing Sheets

DETERMINING CLUSTERS OF SIMILAR ACTIVITIES

CROSS REFERENCE TO OTHER APPLICATIONS

This application claims priority to U.S. Provisional Patent Application No. 62/324,819 entitled CLUSTERER filed Apr. 19, 2016 which is incorporated herein by reference for all purposes.

BACKGROUND OF THE INVENTION

Running and/or cycling routes that are popular among athletes in a particular geographic area are typically manually determined. For example, routes may be identified by athletes to be popular through crowdsourcing votes for frequently used routes. Any information associated with manually identified popular routes may also be manually uploaded and/or approximated.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of clustering activities with similar geolocation data are described herein. A plurality of activities is received. In various embodiments, an "activity" comprises a recorded instance of an athletic performance. Examples of activities include bike rides or runs. In various embodiments, each activity is recorded by a GPS-enabled device with at least GPS data points and time stamps along various points of the activity. One or more clusters of similar activities are determined from the plurality of activities. A map display for the one or more clusters of activities is generated. For example, a map display of a cluster of activities includes a presentation of a representative set of geolocation (e.g., GPS) data associated with the activities of the cluster on a map.

Figure 1:
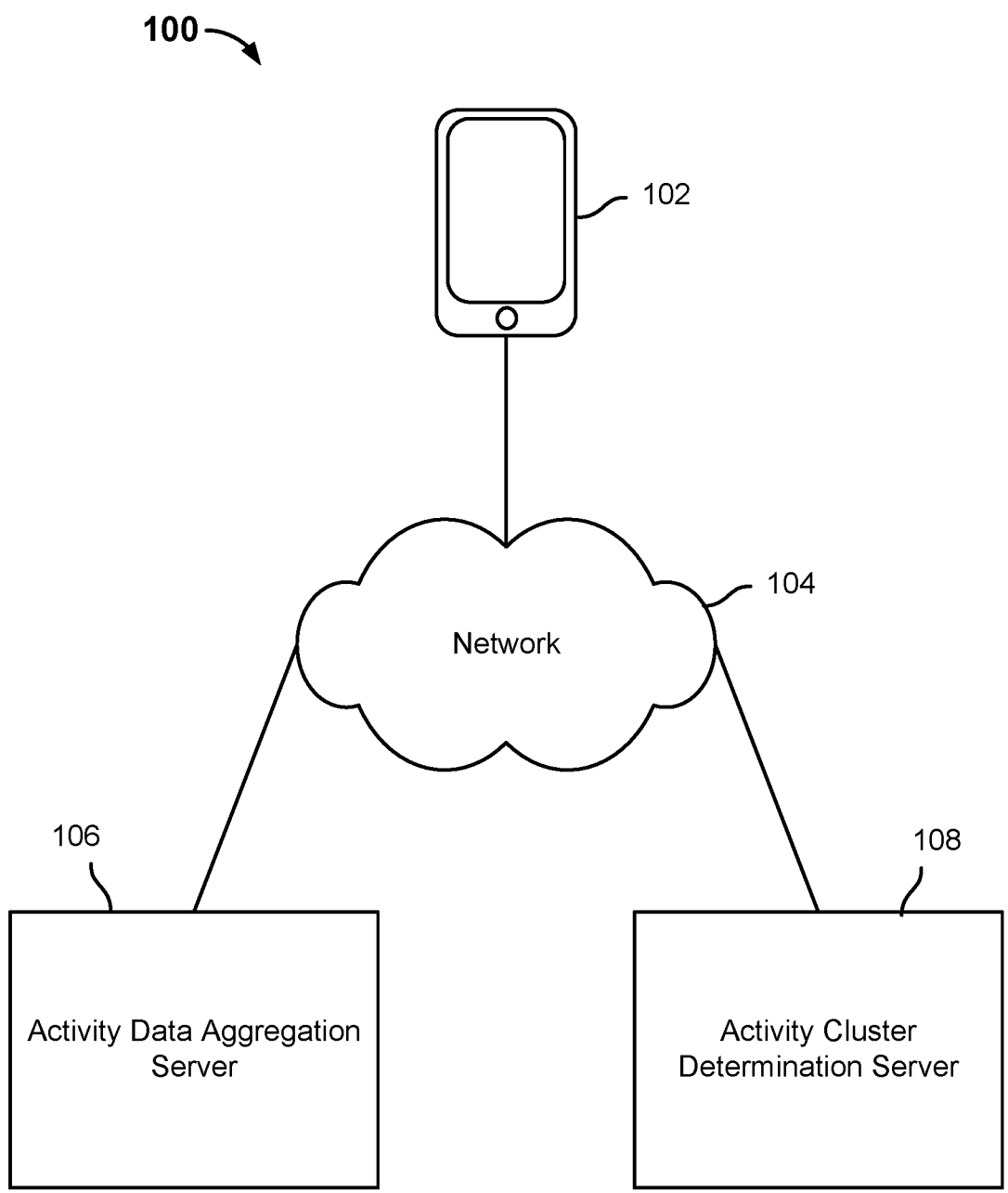
FIG. 1 is a diagram showing a system for determining clustering activities with similar geolocation data in accordance with some embodiments.

FIG. 1 is a diagram showing a system for determining clustering activities with similar geolocation data in accordance with some embodiments. In the example, system 100 includes device 102, network 104, activity data aggregation server 106, and activity cluster determination server 108. Network 104 may include high-speed data networks and/or telecommunication networks.

Device 102 is a device that can record GPS data and/or other data associated with an activity. Device 102 can also be a device to which GPS data and/or other data associated with a physical activity can be uploaded or transferred. Examples of device 102 include, but are not limited to: a GPS device (e.g., Garmin Forerunner® and Edge® devices, including Garmin Forerunner® 110, 205, 301, 305, 310XT, 405, 405CX, and Garmin Edge® 305, 605, 705, 500, 800, 810, and 1000), a mobile phone, such as a smart phone (e.g., an Android®-based device or Apple iPhone® device) including a GPS recording application (e.g., MotionX®, Endomondo®, Strava®, and RunKeeper®), a computer, a tablet device, and/or other general purpose computing devices and/or specialized computing devices, which typically include a general processor, a memory or other storage component(s), a network or input/output (I/O) capability, and possibly integrated GPS functionality or support or an interface for a GPS device or GPS functionality.

In various embodiments, device 102 (or an activity tracking application executing thereon) is configured to record GPS data and auxiliary data associated with an athletic activity during the activity. For example, auxiliary data associated with an activity may include physiological, environmental, and/or performance data. In some embodiments, device 102 is configured to receive recorded GPS data and auxiliary data associated with an activity subsequent to the completion of the activity (e.g., such information is uploaded to device 102).

In some embodiments, an "activity" refers to an instance of an athletic performance. Example types of an activity include cycling, running, and skiing. In some embodiments, GPS data includes a series of consecutive and discrete GPS data points (e.g., latitude and longitude coordinates sometimes referred to as "Lat-Lng Data") with a timestamp for each GPS data point. In some embodiments, auxiliary data includes, but is not limited to, barometric data (e.g., elevation data), heart rate, power/watts (e.g., energy expended), time, speed (e.g., average and/or maximum speed per segment and/or route, in which average speed, for example, can be derived from time and GPS information), and/or cadence. Auxiliary data can be recorded at various granularities. For example, auxiliary data can correspond to each GPS data point, the entire activity (e.g., the auxiliary data includes averages of the metrics), and/or portions of the activity. As an example, one can use device 102 on a bike ride. At the end of the bike ride, the athlete can review his performance with the recorded GPS data (e.g., through a user interface of device 102) to observe the geographical track (e.g., the set of GPS points) that he traversed, how much energy he expended along the ride, how fast he finished it in, average speed, elevation-based metrics, and/or other metrics. In some embodiments, device 102 is configured to store the recorded GPS data and the auxiliary data and/or send the recorded data associated with an athletic activity to activity data aggregation server 106. In some embodiments, device 102 is configured to send the recorded data associated with an activity to activity data aggregation server 106 during the activity (e.g., in real-time) and/or after the activity has been completed. In some embodiments, device 102 is configured to present an interactive user interface (e.g., through an activity tracking application executing at device 102). The user interface may display GPS data and receive selections (e.g., made by a user) with respect to the displays. In some embodiments, device 102 sends the selections that it receives to activity cluster determination server 108.

In some embodiments, a user interface may be presented at device 102. In some embodiments, the user interface may be presented by activity cluster determination server 108 through an associated activity tracking application executing at device 102 or by another component that is not shown in the example of FIG. 1. In some embodiments, the user interface is configured to receive user inputs such as a confirmation of a suggestion to establish an athletic relationship between a first athlete and a second athlete that is sent by activity cluster determination server 108. The user inputs received at device 102 are configured to be sent to activity cluster determination server 108.

Activity data aggregation server 106 is configured to aggregate recorded athletic activity data from devices such as device 102. In some embodiments, the activity data received at activity data aggregation server 106 is received during the activities (e.g., in real-time) and/or subsequent to the completion of the activities. Activity data aggregation server 106 is configured to store information associated with each activity. For example, information associated with each activity includes an identifier associated with the athlete that performed the activity, the activity type associated with the activity, the date and/or period of time during which the activity took place, the device type that was used to record the activity data, and the equipment used by the athlete during the activity. In some embodiments, the information associated with each activity may include attributes associated with the activity that were input by an athlete and/or attributes associated with the activity that were inferred from the recorded data. In some embodiments, the information associated with each activity is stored by activity data aggregation server 106 in an activity table that comprises an SQL database. Activity data aggregation server 106 is configured to store the set of GPS data (e.g., a set of GPS/Lat-Lng data points) and a corresponding auxiliary data (e.g., barometric/elevation data, timestamps, watts, heart rates, power, etc.) associated with (e.g., recorded GPS data point along) each activity. In some embodiments, the set of GPS data and a corresponding set of auxiliary data associated with each activity are stored by activity data aggregation server 106 in a virtual hard drive (e.g., Amazon Simple Storage Service) associated with dynamically expanding storage availability. Activity data aggregation server 106 is configured to process the data received for each activity and perform spatial indexing for each activity based on the set of GPS data associated with the activity. In some embodiments, in performing spatial indexing, the information from the activity table and the GPS and corresponding auxiliary data from the virtual hard drive are put together and recorded for each recorded GPS data point and put into a PostGIS database or other spatially enabled and indexed data structure. Activity data aggregation server 106 is configured to send the aggregated activity data to activity cluster determination server 108.

Activity cluster determination server 108 is configured to find clusters of activities with similar geolocation data. In some embodiments, activity cluster determination server 108 is implemented using Apache Spark® (a distributed cluster computation framework that uses virtual machines running on Amazon Web Services®) and Apache Mesos® (a cluster manager). In various embodiments, activity cluster determination server 108 is configured to obtain a set of activities from activity data aggregation server 106 associated with a particular geographic region and a particular time period. For example, the particular geographic region is the world and the particular time period is the past year. In various embodiments, activity cluster determination server 108 is configured to compare the recorded GPS data corresponding to pairs of activities and generate a pairwise correlation value for each pair of activities. In various embodiments, a pairwise correlation value represents the degree to which the recorded GPS data corresponding to the pair of activities is similar to each other. For example, a pairwise correlation value that is closer to 0 indicates that the recorded GPS data corresponding to the pair of activities is not similar to each other while a pairwise correlation value that is closer to 1 indicates that the recorded GPS data corresponding to the pair of activities is similar to each other. Activity cluster determination server 108 is configured to sort the similar activities into the same cluster based on the activities' pairwise correlation values with each other and/or a predetermined pairwise correlation value threshold value.

In some embodiments, activity cluster determination server 108 is configured to first divide the obtained set of activities (e.g., activities that were recorded within the last year from anywhere in the world) into a set of shards. In various embodiments, a "shard" is a subset of the obtained set of activities. For example, the obtained set of activities may be divided into shards based on time or geography. Once the obtained set of activities is divided into shards, activity cluster determination server 108 is configured to determine pairwise correlation values for pairs of activities within the same shard and then divide the activities within each shard into one or more clusters. Dividing the obtained set of activity data into shards first allows pairwise correlation computations to be determined for only pairs of activities within the same shard (because it is expected that activities of different shards are not similar to each other) and may therefore speed up the clustering process. In some embodiments, clusters from different shards that are determined to be similar to each other may be merged together into a single cluster.

In some embodiments, activity cluster determination server 108 is configured to remove some of the GPS data points that are recorded for each activity prior to computing pairwise correlation computations for pairs of activities. In various embodiments, an "activity stream" refers to the sequence of location (e.g., latitude/longitude, GPS data) points that represents the geographical route of an activity. As such, in some embodiments, activity cluster determination server 108 is configured to perform activity stream simplification to reduce the number of GPS data points from each activity stream prior to determining correlation computations between pairs of activities. In various embodiments, how many GPS data points are to be reduced/removed from each activity stream is determined by a distance parameter that is associated with the selected activity stream simplification technique, as will be described in further detail below. Reducing the number of GPS data points in an activity stream prior to determining correlation computations between pairs of activities speeds up the pairwise correlation computations, for which the complexity increases as the number of GPS data points that are included in an activity stream increases, as will be described in further detail below. In some embodiments, activity cluster determination server 108 is configured to perform multiple passes of activity stream simplification, pairwise correlation computations, and clustering to implement hierarchical clustering (e.g., in which new clusters are split from a previously determined cluster), where each subsequent pass uses an updated distance parameter in the activity stream simplification process. Details of an example process of implementing hierarchical clustering using a multi-pass approach are described in further detail below in FIG. 4.

After activities have been sorted into clusters, activity cluster determination server 108 is configured to determine and store data associated with the clusters. In some embodiments, activity cluster determination server 108 is configured to store a corresponding identifier with each cluster of activities. In some embodiments, activity cluster determination server 108 is configured to generate a representative set of geolocation data associated with a cluster to indicate the cluster's geographic route. In some embodiments, activity cluster determination server 108 is configured to aggregate data (e.g., photos) submitted/generated by users whose activities have been sorted into the same cluster. In some embodiments, activity cluster determination server 108 is configured to present a map display of (e.g., GPS) data associated with a cluster of activities. In some embodiments, activity cluster determination server 108 is configured to receive user submitted queries with activity criteria and return data associated with one or more clusters that match the submitted queries. In some embodiments, activity cluster determination server 108 is configured to determine representative routes of clusters with a large number of activities as popular routes (e.g., to display on a map and/or to recommend to a user).

Activities that belong to the same cluster may have overlapping geography but may start and end at different locations or have sections of non-overlapping but similar geography. For example, a fork may exist in the middle of a route for a brief detour, but activities taking either side of the fork could fall in the same cluster. As such, the determination of clusters' activities with similar geolocation data automatically and organically discovers routes over which athletes commonly perform activity.

Figure 2:
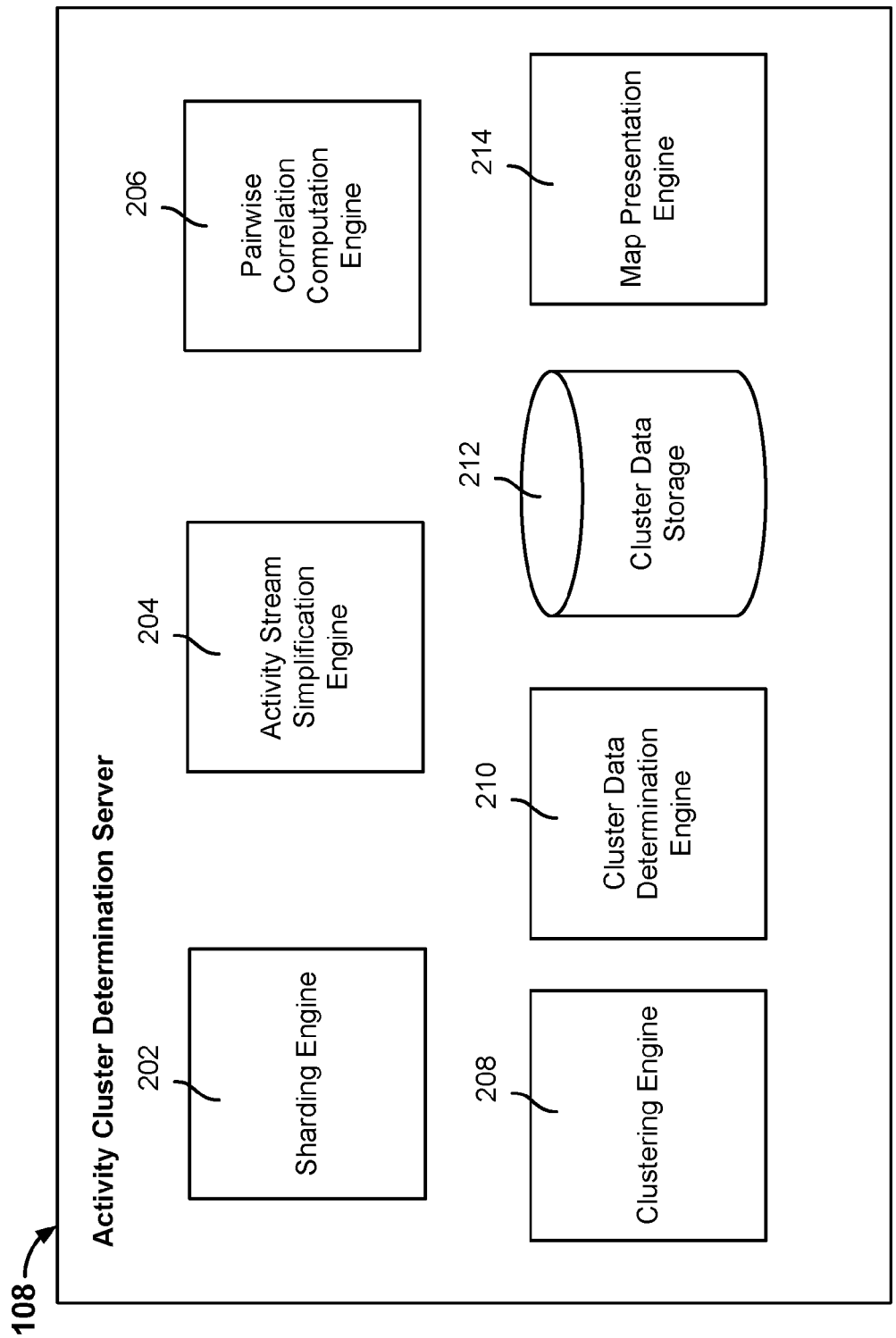
FIG. 2 is a diagram showing an example of an activity cluster determination server in accordance with some embodiments.

FIG. 2 is a diagram showing an example of an activity cluster determination server in accordance with some embodiments. In some embodiments, activity cluster determination server 108 of system 100 of FIG. 1 may be implemented using the example activity cluster determination server of FIG. 2. In the example, the activity cluster determination server comprises sharding engine 202, activity stream simplification engine 204, pairwise correlation computation engine 206, clustering engine 208, cluster data determination engine 210, cluster data storage 212, and map presentation engine 214. Each of sharding engine 202, activity stream simplification engine 204, pairwise correlation computation engine 206, clustering engine 208, cluster data determination engine 210, and map presentation engine 214 can be implemented, for example, as distinct or integrated software components, which can include module(s), package(s), and/or other distinct or integrated sub-components to provide an executable computer program that can perform these described functions when executed on a processor, and can be implemented using a programming language such as Scala, Go, Java, Python, Objective C, and/or other programming languages. An example hardware computing environment to execute the components of FIG. 2 includes a cloud computing service, such as Amazon's Web Services®. Each of cluster data storage 212 may be implemented as one or more databases that may be running Apache Cassandra®.

Sharding engine 202 is configured to first obtain an initial set of activities (e.g., that match a predetermined set of criteria) (e.g., from an activity data aggregation server such as activity data aggregation server 106 of system 100 of FIG. 1). In some embodiments, only activities of the same activity type may be included in the same cluster. In various embodiments, the "activity type" determines a type of the activity, such as biking, running, swimming, skiing, and snowboarding, for example. Sharding engine 202 is then configured to divide/partition the obtained set of activities into multiple subsets, which are referred to as "shards." Partitioning the obtained initial set of activities into smaller subsets will reduce the amount of total computation needed to perform clustering. In some embodiments, sharding engine 202 is configured to divide the obtained initial set of activities based on week of the year (e.g., date-based sharding) and/or geographic region (e.g., using a scheme such as Geohash), for example. For example, the obtained initial set of activities may be biking activities recorded anywhere in the world in the last year. As such, that example initial set of activities may be geohashed into shards such that each shard is associated with a particular geographic region (e.g., a continent). As will be described in further detail below, in some embodiments, clusters of activities are determined for each shard and optionally, clusters determined from different shards may be merged into a single cluster.

Activity stream simplification engine 204 is configured to reduce the number of GPS data points that is recorded in the activity stream of each activity (e.g., for the purposes of faster comparison of the GPS data points between a pair of activity streams). Activity stream simplification engine 204 is configured to reduce the number of GPS data points in activity streams in a way that preserves important features of their structure and such that similar activities are reduced in the same way. In various embodiments, the activity stream simplification technique that is used by activity stream simplification engine 204 uses a distance parameter to determine how many of the GPS data points are to be reduced in an activity stream. For example, one example activity stream simplification technique is the Ramer-Douglas-Peucker (RDP) technique and ε is the distance parameter of the RDP technique that is used to determine how many of the GPS data points are to be reduced in an activity stream. In various embodiments, pairwise correlation computation engine 206 is configured to determine the pairwise computation between a pair of activities based on comparing the activities' respective reduced activity streams, as will be described in further detail below. In some embodiments, when hierarchical clustering is performed, activity stream simplification engine 204 is configured to reduce the activity stream for the same activity over different passes of clustering based on new distance parameter values (e.g., new values of ε) so that new pairwise correlation computations may be performed for activities that have been previously sorted into the same cluster and therefore, a previously determined cluster may be split into one or more new clusters, as will be described further below.

Pairwise correlation computation engine 206 is configured to compare the respective activity streams of a pair of activities to determine a pairwise correlation value that represents the degree to which the two activity streams are similar. In some embodiments, the pairwise correlation value is determined on a scale of "0" to "1," where "0" represents two dissimilar activity streams (e.g., two activities with dissimilar geolocation data/geolocation data that is relatively far from each other) and "1" represents two similar activity streams (e.g., two activities with similar geolocation data/geolocation data that is relatively close to each other). In some embodiments, if the activity streams corresponding to two activities have been reduced by activity stream simplification engine 204, pairwise correlation computation engine 206 is configured to compare and use the reduced activity streams of the pair of activities to determine the pairwise correlation value of the pair of activities.

In some embodiments, pairwise correlation computation engine 206 is configured to first determine a mapping between the GPS data points of the (e.g., reduced) activity stream of a first activity of an input pair of activities and the GPS data points of the (e.g., reduced) activity stream of a second activity of the input pair of activities using a dynamic warping technique. Specifically, the dynamic warping technique finds for each GPS data point of each (e.g., reduced) activity stream of a first activity of an input pair of activities, a corresponding (e.g., best location match) GPS data point of the (e.g., reduced) activity stream of a second activity of the input pair of activities. Put another way, the mapping is a sequence of GPS data point pairs, where the first GPS data point in each pair is from the activity stream of the first activity and the second GPS data point in each pair is from the activity stream of the second activity. The mapping includes every GPS data point from both (e.g., reduced) activity streams in order. The mapping is also optimal in the sense that no other mapping has a lower sum of distances between points in each pair. Next, pairwise correlation computation engine 206 is configured to compute the pointwise correlation function for each pair of GPS data points in this mapping. For example, the pairwise correlation function between a pair of GPS data points of the mapping computes the distance between the two GPS data points and gives "1" if the GPS data points are very close together and "0" if the GPS data points are far apart. An example of such a pairwise correlation function is below:

$$e^{-\frac{(max(d-50,0))^2}{2r^2}} \quad (1)$$

Where d is distance in meters, r is a parameter that is normally set as the distance parameter of the activity stream simplification technique (e.g., the value of ε in the RDP technique), and the subtraction of 50 from d is to account for inherent error in latitude/longitude coordinates due to GPS uncertainty, as well as point sampling issues. The correlation values corresponding to each pair of GPS data points in the mapping are then weighted by the distance to adjacent GPS data points in each (e.g., reduced) activity stream. Finally, a sum is taken of all the weighted correlation values of the pairs of GPS data points in the mapping and then normalized by dividing by the total length of both activity streams to produce the pairwise correlation value between the pair of activities. Because pairwise correlation values between two activities are computed based on the GPS data points that are present in the activity streams of the activities, the pairwise correlation computation can be computed much faster using simplified streams instead of the full streams.

Clustering engine 208 is configured to determine one or more clusters of similar activities from a set of activities. In some embodiments, clustering engine 208 is configured to determine clusters from a given set of activities (e.g., a set of activities associated with a shard or a previously determined cluster of activities) based on the activities' respective pairwise correlation computations with each other. In some embodiments, clustering engine 208 is configured to input the pairwise correlation value between each activity and each other activity of the given set of activities into a similarity matrix and then apply a clustering technique to the similarity matrix to split the activities of the given set into one or more clusters of similar activities. In some embodiments, clustering engine 208 is configured to use K-means or hierarchical clustering technique and/or a similarity threshold value (e.g., a value chosen between 0 to 1) to split the given set of activities into one or more clusters of similar activities. Activities that are split into the same cluster are more similar to other activities within the same cluster than activities of any other cluster, generally.

In some embodiments, as an optimization, while adding activities to a new cluster, clustering engine 208 selects a new exemplar activity as a "leader" of that cluster. The leader is then used for comparison with activities not in the cluster, rather than the original first member activity of a cluster. For example, the leader is chosen by sampling random activities in the cluster, and taking the activity with the highest total similarity with all other sampled activities. The idea is that the new leader is likely to be closer to the "center" of the forming cluster. In some embodiments, deciding when to choose a new leader might be done randomly or according to some heuristic.

In some embodiments, after pairwise correlation computation engine 206 has computed pairwise correlation values between each pair of activities of the shard based on their respective activity streams that have been reduced by activity stream simplification engine 204 using an initial distance parameter, clustering engine 208 is configured to split new clusters from each shard (that is determined by sharding engine 202) based on the pairwise correlation computations. In some embodiments, in the event that hierarchical clustering is not used, clustering engine 208 may store data identifying each cluster of activities that have been determined from the shards. In the event that hierarchical clustering is used, clustering engine 208 is configured to recursively split new clusters from each previously determined cluster until one or more stop conditions are met. In some embodiments, to perform hierarchical clustering, for each subsequent pass of clustering that is performed by clustering engine 208, activity stream simplification engine 204 is configured to reduce the activity streams of activities of each activity in a previously determined cluster based on an updated distance parameter (e.g., a parameter that is lower than a previous distance parameter) and pairwise correlation computation engine 206 is configured to determine pairwise correlation values between each unique pair of activities within the same previously determined cluster. Then, clustering engine 208 is configured to split the activities of the same previously determined cluster into one or more new clusters of activities. Distance parameter values (e.g., ε in the RDP technique) might start at 50 kilometers, and geometrically decrease to a minimum of 200 meters over 5-10 passes of clustering. The computational cost of each pairwise activity correlation calculation is much less with larger values of ε, however, there are more comparisons to do in the initial passes since the average cluster size is larger. The use of multiple passes of hierarchical clustering lowers the computational cost of clustering by performing much of the clustering work using the cheaper pairwise activity correlation calculation (e.g., as described above, pairwise activity correlation calculations that are determined using greater values of the distance parameter are less computationally expensive than calculations that are determined using lower values of the distance parameter). Clustering engine 208 is configured to split each previously determined cluster into new clusters until one or more stop conditions are met. Examples of a stop condition include: a predetermined distance parameter value associated with the stream simplification technique has been reached and a cluster is determined to have the minimum number of activities and/or unique athletes.

The following is an example hierarchical clustering technique that may be implemented by at least sharding engine 202, activity stream simplification engine 204, pairwise correlation computation engine 206, and clustering engine 208: all activities are first sharded into smaller groups by activity type, day, and location. Activities in a single shard are then sorted into a random order. The first activity becomes the first member of a new cluster. This leader activity is then compared to all other activities remaining in the shard using the pairwise correlation function (e.g., function (1), above). Initially, the correlation values may be calculated on streams that are greatly simplified (reduced number of points in the stream) by using the RDP technique with a large ε value. Then, the set of all other activities with similarity to the first activity above a threshold of ~0.8 are also added to the new cluster. This process is repeated until the list of activities not yet assigned to a cluster is empty and every activity has been assigned to a cluster. Clusters generated by this step are further divided into smaller clusters by repeating this process using a smaller value of ε for the RDP algorithm used in the activity stream simplification. A smaller value of ε results in a higher fidelity comparison of activities and can be more discriminative between similar activities.

Cluster data determination engine 210 is configured to determine an identifier associated with each cluster of activities that is determined by clustering engine 208. Cluster data determination engine 210 is configured to determine, compute, and/or obtain various types of information associated with activities that belong to a particular cluster and store such cluster data in cluster data storage 212. For example, the selected activity may be the activity that has the highest pairwise correlation value with each other activity in the same cluster. In some embodiments, cluster data determination engine 210 is configured to determine one or more names for the cluster based on analyzing the user input names of each activity that belongs to the cluster. In some embodiments, cluster data determination engine 210 is configured to determine statistics about activities in a cluster. Examples of statistics include the distributions of when the activities happen by hour of day, day of week, and month of year. In some embodiments, cluster data determination engine 210 is configured to detect whether there is a regular recurrence (e.g., daily, weekly, monthly, annually) associated with activities that belong to a cluster. In some embodiments, cluster data determination engine 210 is configured to determine the total number of unique athletes whose activities belong in a cluster. In some embodiments, cluster data determination engine 210 is configured to determine the average distance and/or speed of activities that belong to a cluster (because activities of different lengths but with similarities in location may be sorted into the same cluster). In some embodiments, cluster data determination engine 210 is configured to aggregate user uploaded content (e.g., photos, notes) associated with activities that belong to a cluster.

In some embodiments, cluster data determination engine 210 is configured to determine a representative set of geolocation data to represent the route associated with a cluster. For example, the representative set of geolocation data to represent the route associated with a cluster may be the GPS data recorded for one activity that is selected from the cluster of activities. In some embodiments, cluster data determination engine 210 is configured to send representative geolocation data associated with the representative routes of one or more clusters to map presentation engine 214 for map presentation engine 214 to display on a corresponding portion of a map. In some embodiments, cluster data determination engine 210 is configured to receive a user query for clusters that match a set of cluster criteria. In response, cluster data determination engine 210 is configured to search through cluster data storage 212 to determine one or more clusters that match the set of cluster criteria and cause the map presentation engine 214 to display the representative routes of the one or more matching clusters on corresponding portions of a map.

In some embodiments, cluster data determination engine 210 is configured to compare geolocation data recorded so far associated with a currently ongoing activity and compare the geolocation data to representative geolocation data associated with determined clusters to determine whether the currently ongoing activity matches any clusters. Then, the representative routes of the one or more matching clusters may be presented on corresponding portions of a map by map presentation engine 214.

In some embodiments, cluster data determination engine 210 is configured to compare geolocation data associated with a recently completed activity and compare the geolocation data to representative geolocation data associated with determined clusters to determine whether the currently ongoing activity matches any clusters. Then, the representative routes of the one or more matching clusters may be presented on corresponding portions of a map by map presentation engine 214.

Figure 3:
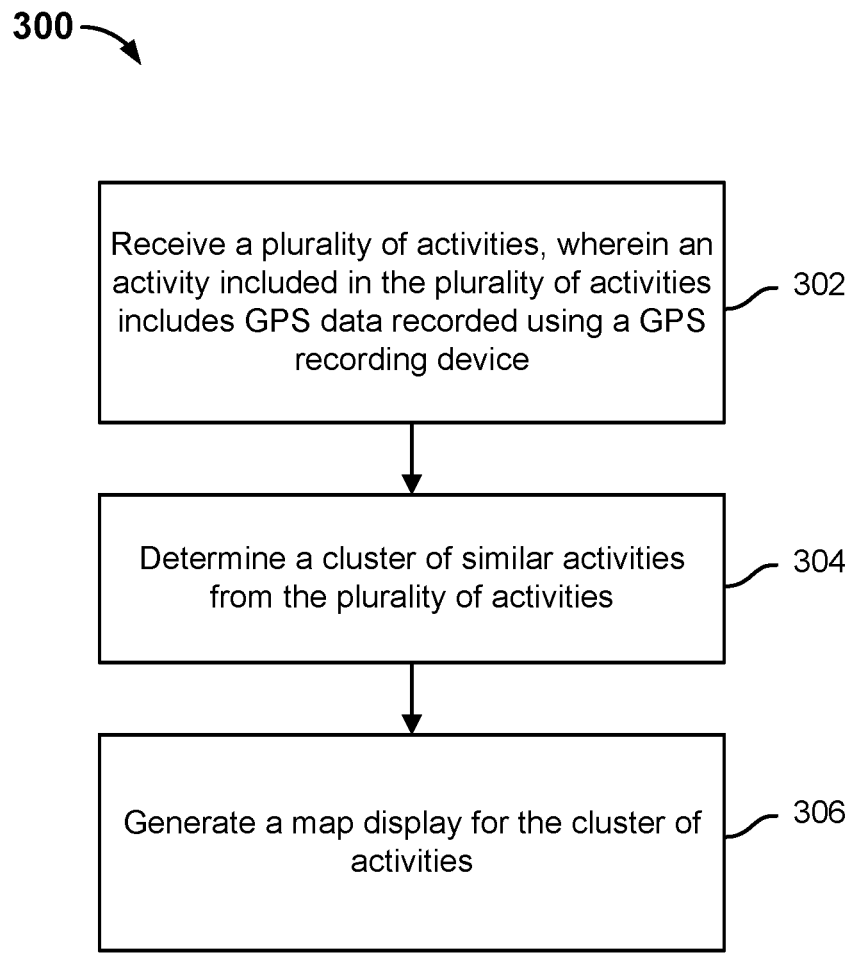
FIG. 3 is a flow diagram showing a process of clustering activities with similar geolocation data in accordance with some embodiments.

FIG. 3 is a flow diagram showing a process of clustering activities with similar geolocation data in accordance with some embodiments. In some embodiments, process 300 is implemented at system 100 of FIG. 1. Specifically, in some embodiments, process 300 is implemented at activity cluster determination server 108 of system 100 of FIG. 1.

At 302, a plurality of activities is received, wherein an activity included in the plurality of activities includes GPS data recorded using a GPS recording device. In some embodiments, the received activities are of the same activity type (e.g., cycling, running, swimming, or skiing). In some embodiments, the plurality of activities is recorded by GPS recorded devices and/or applications executing at GPS enabled devices. In some embodiments, the plurality of activities matches a set of criteria associated with location (e.g., anywhere in the world) and time (e.g., recorded at any time within the past year).

At 304, a cluster of similar activities is determined from the plurality of activities. In some embodiments, the activity stream (e.g., the set of GPS data points recorded for each activity) is reduced using an activity simplification technique (e.g., RDP) and the corresponding reduced activity streams of each unique pair of activities of the plurality of activities are compared to determine a pairwise correlation value for the pair of the activities. The pairwise correlation value for each unique pair of the activities is analyzed using a clustering technique (e.g., K-means) to determine a set of clusters, where an activity within one cluster is determined to be more similar to each other activity in the same cluster than an activity that belongs to any other cluster.

At 306, a map display for the cluster of similar activities is generated. A representative set of GPS data is determined to represent the route of each cluster of activities. In some embodiments, the representative set of GPS data to represent the route of each cluster of activities comprises an average of the set of GPS data that was recorded for a subset of activities in the cluster. In some embodiments, the representative set of GPS data to represent the route of each cluster of activities comprises the set of GPS data that was recorded for a selected activity in the cluster. In some embodiments, the representative set of GPS data to represent the route of each cluster of activities comprises the sets of GPS data that were recorded for a selected subset of activities in the cluster.

Figure 4:
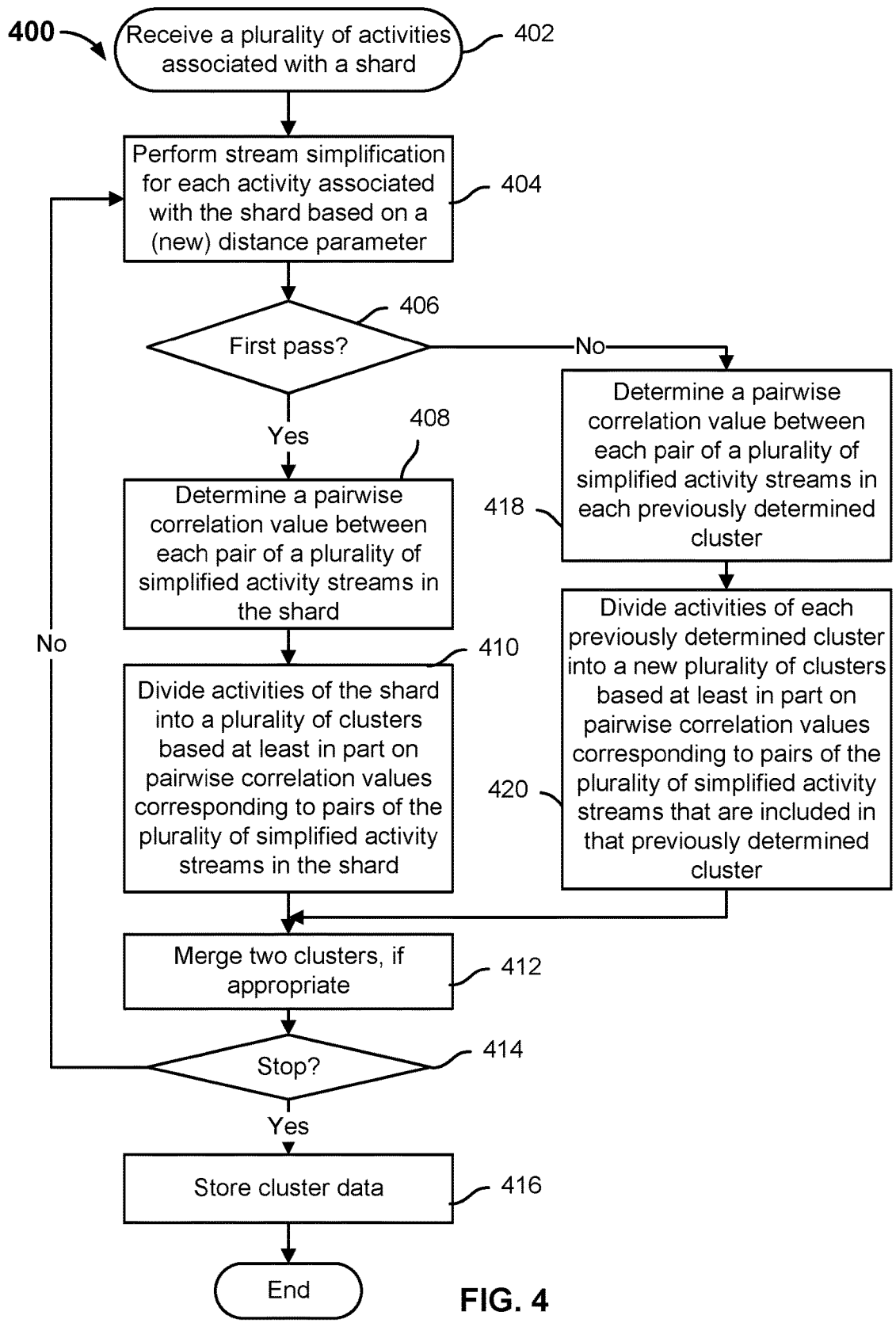
FIG. 4 is a flow diagram showing a process for performing hierarchical clustering of activities with similar geolocation data in accordance with some embodiments.

FIG. 4 is a flow diagram showing a process for performing hierarchical clustering of activities with similar geolocation data in accordance with some embodiments. In some embodiments, process 400 is implemented at system 100 of FIG. 1. Specifically, in some embodiments, process 400 is implemented at activity cluster determination server 108 of system 100 of FIG. 1. In some embodiments, steps 302 and 304 of process 300 of FIG. 3 may be implemented using a process such as process 400.

Process 400 describes an example process of hierarchical clustering, in which a shard of activities is split into one or more clusters and each of those clusters is recursively split into smaller clusters until a stop condition is met.

At 402, a plurality of activities associated with a shard is received. In some embodiments, an initial set of activities has been split into several shards. In a first example, each shard may include activities that are associated with a different geographic region (e.g., continent) of the world. In a second example, a grid of tiles, each of a 100 km by 100 km dimension, for example, is determined over the world and each shard includes the activities that predominantly if not entirely occur within a particular tile of the grid. Process 400 may be repeated or simultaneously performed for each shard of activities.

At 404, stream simplification is performed for each activity associated with the shard based on a (new) distance parameter. As mentioned above, to reduce the complexity and computational cost associated with comparing the activity stream (e.g., GPS data points) that is recorded for an activity against the activity stream that is recorded for another activity, the number of GPS data points that are included in the activity stream for each activity is reduced to a subset of the originally recorded GPS data points using a stream simplification technique. For example, the RDP technique of stream simplification may be used to reduce the recorded GPS data points in a manner that also preserves the shape of an activity stream. The fewer GPS data points that are reduced, the more the shape of an activity stream may be preserved. In the RDP technique, the distance parameter of $\varepsilon$ determines the degree to which the shape of an activity stream may be preserved and therefore determines how many of the originally recorded GPS data points in an activity stream are to be reduced. The reduced activity streams would include less than all of the originally recorded GPS data points and it would therefore be computationally less expensive to compute the pairwise correlation value between the reduced activity streams of a pair of activities, as will be performed at steps 406 or 408, than it would be to compute the pairwise correlation value between the original activity streams of the pair of activities. The greater the value of $\varepsilon$ that is used, the greater number of the originally recorded GPS data points that will be reduced and therefore, the computationally cheaper and faster the pairwise correlation values may be computed. Similarly, the lower the value of $\varepsilon$ that is used, the fewer number of the originally recorded GPS data points that will be reduced and therefore, the more computationally expensive and slower the pairwise correlation values may be computed.

In some embodiments in which the RDP technique is used at step 404 of process 400, in the first pass of clustering, in which a shard of activities is to be split into clusters, the value of $\varepsilon$ is initially set to be a relatively high value. While there are more unique pairs of activities in a shard of activities to compare to determine pairwise correlation values, the larger number of pairwise correlation computations would be offset by the relatively cheaper and faster computation of each individual pairwise correlation value computation. After the first pass of clustering, the shard of activities is split into multiple clusters and the clustering steps of 418, and 420 are then performed for each individual cluster of activities. Therefore, in each pass of clustering that is subsequent to the first pass, there are fewer activities (and therefore fewer unique pairs of activities) in a cluster and as such, fewer unique pairs of activities to compare to determine pairwise correlation values. In some embodiments, in each pass of clustering that is subsequent to the first pass, $\varepsilon$ is set to be a decreasingly lower value, which would add additional refinement to the pairwise correlation value computations but also more computational cost per pairwise correlation value calculation. Nevertheless, as clusters are repeatedly split into smaller clusters in each subsequent pass of clustering, fewer pairwise correlation value computations are needed to be performed for each cluster. In a specific example, the value of $\varepsilon$ may be set to 50 kilometers in the first pass, and then geometrically decrease to a minimum of 200 meters over 5-10 passes of clustering. The computational cost of each activity correlation calculation is much less with larger values of ε, however there are more comparisons to do in the initial passes since the average cluster size is larger. This optimization lowers the computational cost of clustering by performing much of the clustering work using cheaper pairwise correlation calculations.

At 406, it is determined whether it is the first pass of clustering. In the event that it is the first pass of clustering, control is transferred to 408. Otherwise, in the event that it is not the first pass of clustering, control is transferred to 418. The first pass of clustering splits a shard of activities into one or more clusters. Each subsequent pass of clustering splits a previously determined cluster of activities into smaller clusters.

At 408, a pairwise correlation value is determined between each pair of a plurality of simplified activity streams in the shard. A pairwise correlation value on a scale of 0 to 1, in some embodiments, is determined for each unique pair of activities of the shard. An example process for determining the pairwise correlation value between two activities is described in FIG. 5, below.

At 410, activities of the shard are divided into a plurality of clusters based at least in part on pairwise correlation values corresponding to pairs of the plurality of simplified activity streams in the shard. In some embodiments, is a similarity matrix is generated by inputting the pairwise correlation values between each unique pair of activities of the shard into a matrix data structure (e.g., a two-dimensional array). Then a clustering technique (e.g., K-means) and/or a predetermined pairwise correlation value threshold value (e.g., 0.8) is applied to the similarity matrix to split the activities of the shard into clusters of similar activities.

At 418, a pairwise correlation value is determined between each pair of a plurality of simplified activity streams in each previously determined cluster. A pairwise correlation value on a scale of 0 to 1, in some embodiments, is determined for each unique pair of activities of each previously determined cluster. An example process for determining the pairwise correlation value between two activities is described in FIG. 5, below.

At 420, activities of each previously determined cluster are divided into a new plurality of clusters based at least in part on pairwise correlation values corresponding to pairs of the plurality of simplified activity streams that are included in that previously determined cluster. In some embodiments, a similarity matrix is generated by inputting the pairwise correlation values between each unique pair of activities of each previously determined cluster into a matrix data structure (e.g., a two-dimensional array). Then a clustering technique (e.g., K-means) and/or a predetermined pairwise correlation value threshold value (e.g., 0.8) is applied to the similarity matrix to split the activities of that previously determined cluster into clusters of similar activities.

At 412, two clusters are merged, if appropriate. In some embodiments, clusters are compared to determine whether two clusters of activities have similar enough geolocation data to merge into a single cluster of activities.

In some embodiments, to compare two clusters, a "leader" activity is first selected from each cluster to represent the cluster. For example, the leader is chosen by sampling random activities in the cluster, and taking the activity with the highest total correlation with all other sampled activities. The respective leaders of two clusters are compared to determine whether the two leader activities have a similarity (e.g., a pairwise correlation value) that meets a predetermined merging threshold value. If the threshold value is met, then the two clusters of activities are merged into a single cluster.

In some embodiments, a cluster of activities that is determined from a shard of activities may be compared with a cluster of activities that is determined from another shard of activities (to combine similar activities that were inadvertently sharded into different shards). For example, in merging step 412, a new grid for sharding that is offset from the original grid that was used to determine the shard of activities that was received at step 402 is used to shard the so far determined clusters and clusters that are located in different (e.g., neighboring) new shards are compared to each other to determine whether any two clusters should be merged.

At 414, it is determined whether to stop the clustering process. In the event that it is determined that one or more stop conditions are met, process 400 ends and the cluster data is stored at step 416. Otherwise, in the event it is determined that one or more stop conditions are not met, a new distance parameter (e.g., an ε that is lower than the previous value) is chosen (e.g., based on a predetermined decrementing scheme) and control is returned to step 404. Examples of a stop condition are if a predetermined number of clustering passes have already been performed, a predetermined minimum number of activities have been determined in a cluster, a predetermined minimum number of unique athletes are associated with a cluster, and a predetermined minimum of the distance parameter (e.g., ε) has been reached.

Figure 5:
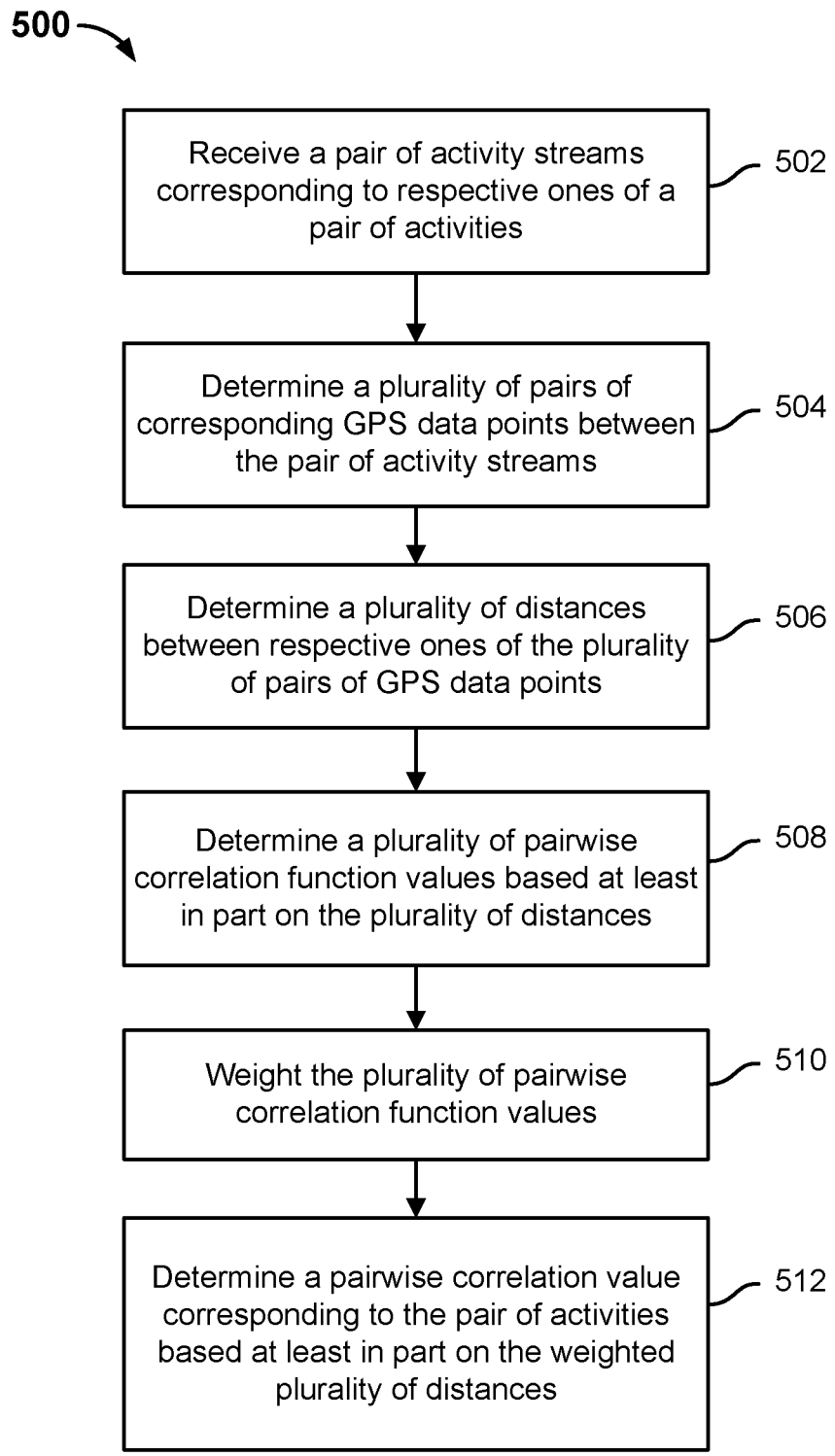
FIG. 5 is a flow diagram showing a process for determining a pairwise correlation value between a pair of activities in accordance with some embodiments.

FIG. 5 is a flow diagram showing a process for determining a pairwise correlation value between a pair of activities in accordance with some embodiments. In some embodiments, process 500 is implemented at system 100 of FIG. 1. Specifically, in some embodiments, process 500 is implemented at activity cluster determination server 108 of system 100 of FIG. 1. In some embodiments, steps 408 and 418 of process 400 of FIG. 4 may be implemented using a process such as process 500.

At 502, a pair of activity streams corresponding to respective ones of a pair of activities is received. For example, the pair of activities may be included in the same shard or included in the same previously determined cluster. In another example, one activity of the pair may be from one previously determined cluster and the other activity of the pair may be from another previously determined cluster. In yet another example, one activity of the pair may be from one previously determined cluster and the other activity of the pair may not be part of any cluster. In some embodiments, the activity stream corresponding to each activity of the pair may include all the originally recorded GPS data points for the activity or the activity stream may have been reduced (e.g., using a stream simplification technique such as RDP) to include fewer than all of the originally recorded GPS data points for the activity.

At 504, a plurality of pairs of corresponding GPS data points between the pair of activity streams is determined. A mapping is found between the activity streams of the two activities such that for each GPS data point in the activity stream of the first activity, a corresponding (e.g., best location match) GPS data point in the activity stream of the second activity is determined. The mapping includes every GPS data point from both streams in order. For example, the mapping may be determined using a dynamic warping technique that finds the mapping that has the lowest sum of distances between GPS data points in each pair.

Figure 6:
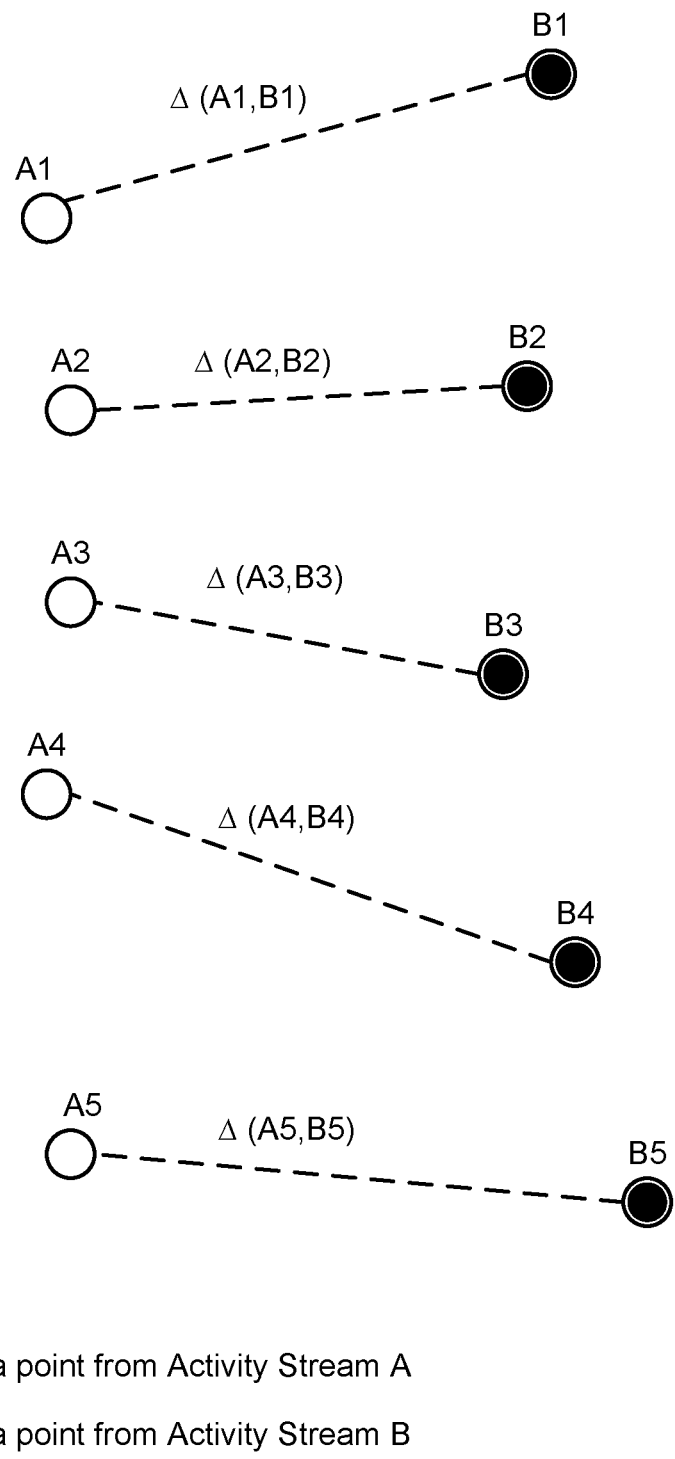
FIG. 6 shows GPS data points from two activity streams, corresponding to two different activities, Activity A and Activity B.

FIG. 6 shows GPS data points from two activity streams, corresponding to two different activities, Activity A and Activity B. The activity stream of Activity A includes GPS data points A1, A2, A3, A4, and A5 and the activity stream of Activity B includes GPS data points B1, B2, B3, B4, and B5. Applying step 504 of process 500 to the activity streams of FIG. 6, the mapping that is found between the activity streams of Activities A and B results in pairs of points that include: (A1, B1), (A2, B2), (A3, B3), (A4, B4), and (A5, B5).

Returning to FIG. 5, at 506, a plurality of distances between respective ones of the plurality of pairs of GPS data points is determined. The distance between each pair of GPS data points, each from an activity stream of a different activity, of the mapping is determined.

In FIG. 6, a distance is computed for each pair of GPS data points determined from the activity streams of Activities A and B. The distance determined for (A1, B1) is denoted as Δ(A1, B1), the distance determined for (A2, B2) is denoted as Δ(A2, B2), the distance determined for (A3, B3) is denoted as Δ(A3, B3), the distance determined for (A4, B4) is denoted as Δ(A4, B4), and the distance determined for (A5, B5) is denoted as Δ(A5, B5).

Returning to FIG. 5, at 508, a plurality of pairwise correlation function values based at least in part on the plurality of distances is determined. A pairwise correlation function value is computed based on the distance between each pair of GPS data points of the mapping. Formula (1), as described above and reproduced below, may be used to determine the pairwise correlation function value for a pair of GPS data points:

$$e^{-\frac{(max(d-50,0))^2}{2r^2}} \quad (1)$$

Where d is distance between a pair of GPS data points (e.g. Δ(A1, B1) for GPS data points A1 and B1 of the example in FIG. 6) in meters, r is a parameter that is normally set as the distance parameter of the activity stream simplification technique (e.g., the value of ε in the RDP technique), and the subtraction of 50 from d is to account for inherent error in latitude/longitude coordinates due to GPS uncertainty, as well as point sampling issues.

At 510, the plurality of pairwise correlation function values is weighted. The pairwise correlation function values corresponding to each pair of GPS data points in the mapping are then weighted by the distance to adjacent GPS data points in each activity stream, in some embodiments.

At 512, a pairwise correlation value corresponding to the pair of activities is determined based on the weighted plurality of distances. In some embodiments, a sum is taken of all the weighted pairwise correlation function value of the pairs of GPS data points in the mapping and then normalized by dividing by the total length of both activity streams to produce the pairwise correlation value between the pair of activities. Because pairwise correlation values between two activities are computed based on the GPS data points that are present in the activity streams of the activities, the pairwise correlation computation can be computed much faster using simplified streams instead of the full streams.

Figure 7:
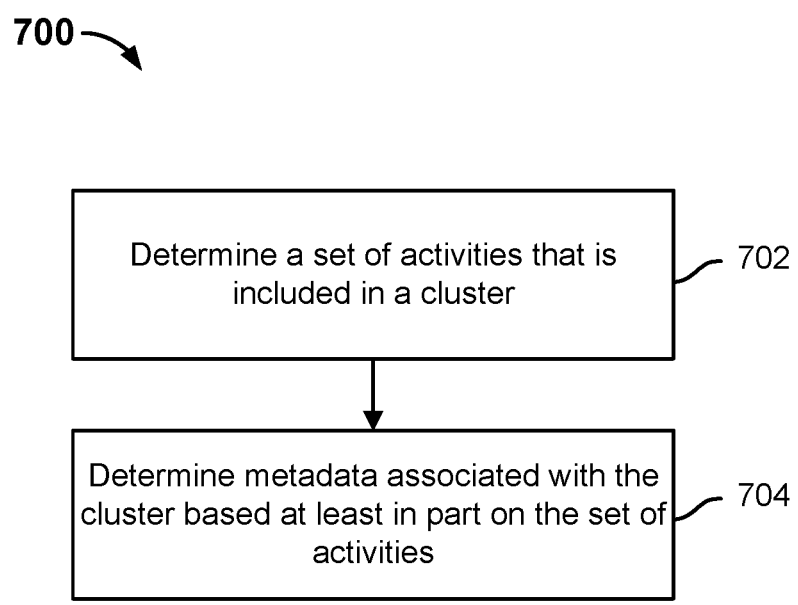
FIG. 7 is a flow diagram showing a process of storing data associated with a cluster in accordance with some embodiments.

FIG. 7 is a flow diagram showing a process of storing data associated with a cluster in accordance with some embodiments. In some embodiments, process 700 is implemented at system 100 of FIG. 1. Specifically, in some embodiments, process 700 is implemented at activity cluster determination server 108 of system 100 of FIG. 1.

At 702, a set of activities that is included in a cluster is determined. In various embodiments, clusters of similar activities have already been determined using a process such as process 400 of FIG. 4.

At 704, metadata associated with the cluster is determined based at least in part on the set of activities. In some embodiments, a unique identifier may be stored for the cluster of the activities. In some embodiments, the total number of activities that belong to a cluster is determined. In some embodiments, the total number of unique athletes that have performed activities that belong to a cluster is determined. For example, the total number of activities that belong to a cluster or the total number of unique athletes that have performed activities that belong to a cluster may be used to determine how popular the cluster is relative to other clusters. In some embodiments, a representative set of geolocation data associated with a cluster is generated to indicate the cluster's geographic route. For example, the representative set of geolocation data may be determined based on the recorded GPS data associated with a selected activity (e.g., the leader activity) of the cluster and/or based on the averaged recorded GPS data associated with a (e.g., randomly) selected subset of activities of the cluster. In some embodiments, data (e.g., photos) submitted/generated by athletes whose activities have been sorted into the cluster are aggregated. For example, the photos might help characterize the route and event.

In some embodiments, one or more canonical names are determined for each cluster based on analyzing user submitted names of the activities included in the cluster. For example, each activity has a title that is set by the athlete that had recorded the activity. In some embodiments, the titles of activities that belong to the same cluster can be used to find a single canonical name for the cluster. In some embodiments, the titles are broken into all possible n-grams. For example, a title "morning bike ride" would become ["morning bike ride," "morning bike," "bike ride," "morning," "bike," "ride"]. The "term frequency-inverse document frequency" or "tf-idf" algorithm score, for example, is then taken for each n-gram in each cluster. Here, a "term" refers to a single n-gram and a "document" refers to a set of all n-grams from all activities in a cluster. For example, the n-gram with the highest score from a cluster is used as the canonical title. Term frequency (tf) for an n-gram is the logarithm of the occurrences of that n-gram in a single cluster. Inverse document frequency (idf) for an n-gram is the logarithm of the number of clusters with any occurrences of that n-gram. The tf-idf score is just the product of tf and idf. Intuitively, n-grams have a higher score in a cluster if they are more common in that cluster and also less common to occur at all in other clusters.

In some embodiments, statistics about the activities in a cluster can be determined from analyzing the recorded information of the activities. For example, times and dates at which the activities were recorded may be analyzed to determine the distributions of when the activities happen by hour of day, day of week, and month of year. For example, a commute route cluster might be more frequent on weekdays in the morning, whereas a long cycling cluster might be more common on weekends during the entire day. For example, such statistics may be displayed as histograms when information associated with the cluster is presented.

In some embodiments, a cluster with a majority of activities occurring on a single day is labeled as an "annual event" and automatically detected. An example might be a city marathon that is run annually. The date of an annual cluster may be shown in a user interface, for example, and the user can supply a search parameter to see only annual clusters, or further filter to see annual clusters in a particular time range of the year. In some embodiments, the cluster data associated with an annual event may be imported into a page that presents information regarding the annual event. In some embodiments, if the annual event has a segment associated with it (the segment comprises a set of GPS data points that defines a geographical track), then activities that match the cluster event associated with the annual event may be compared against the segment to determine the information (e.g., race times) associated with a portion of the activities that match the segment.

In some embodiments, a cluster that has a majority of activities that occur on specific weekdays or weekends are classified as recurring weekly. An example might be a "Sunday park run" route that is raced every Sunday but no other day of the week. The user can supply weekly recurrence as a search parameter for clusters, for example, to find only clusters with weekly recurrence on particular weekdays.

In some embodiments, the median or average distance of the activities in each cluster is saved. The user can supply distance bounds as a search parameter for clusters, for example. This could be used for example to find bike rides 50-80 miles long, or to find running routes exactly 5 kilometers long.

Other types of data associated with a cluster, which may be derived from the activities that belong to the cluster and are not described herein may be determined and stored with the cluster as well.

Figure 8:
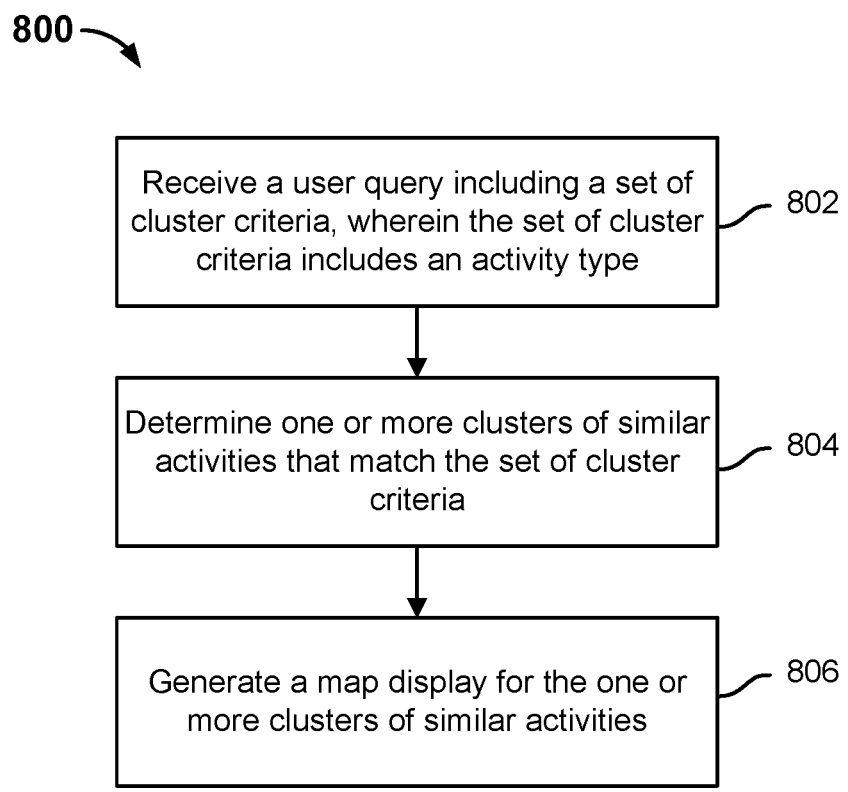
FIG. 8 is a flow diagram showing a process of searching for a cluster of similar activities in accordance with some embodiments.

FIG. 8 is a flow diagram showing a process of searching for a cluster of similar activities in accordance with some embodiments. In some embodiments, process 800 is implemented at system 100 of FIG. 1. Specifically, in some embodiments, process 800 is implemented at activity cluster determination server 108 of system 100 of FIG. 1.

At 802, a user query including a set of cluster criteria is received, wherein the set of cluster criteria includes an activity type. In various embodiments, clusters of similar activities have already been determined using a process such as process 400 of FIG. 4 and data has been stored for each cluster using a process such as process 700 of FIG. 7. In various embodiments, a cluster criterion is an attribute associated with the activities that a user is seeking in a cluster of similar activities. The set of cluster criteria may be received via a user interactive element at a user interface, for example. Examples of cluster criteria include a range of the average distance, the activity type, whether and which type of recurrence, and how popular the cluster is of activities relative to other clusters.

At 804, one or more clusters of similar activities that match the set of cluster criteria are determined. The determined data of each cluster is compared to the cluster criteria to determine one or more clusters that match.

At 806, a map display for the one or more clusters of similar activities is generated. A representative set of GPS data is determined to represent the route of each matching cluster of activities. In some embodiments, the representative set of GPS data to represent the route of each cluster of activities comprises an average of the set of GPS data that was recorded for a subset of activities in the cluster. In some embodiments, the representative set of GPS data to represent the route of each cluster of activities comprises the set of GPS data that was recorded for a selected activity in the cluster. In some embodiments, the representative set of GPS data to represent the route of each cluster of activities comprises the sets of GPS data that were recorded for a selected subset of activities in the cluster.

Figure 9:
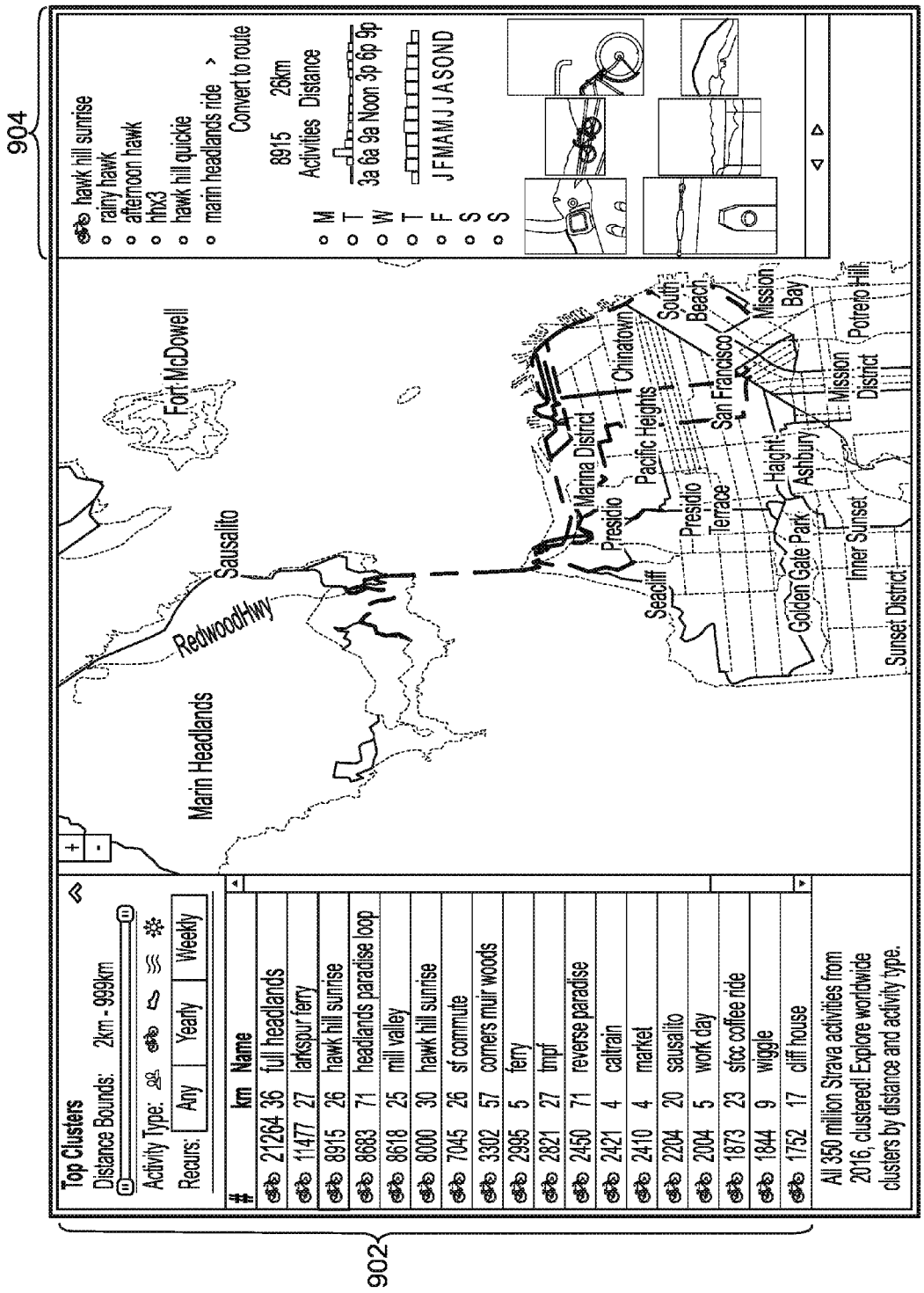
FIG. 9 is an example map display of various clusters in accordance with some embodiments.

FIG. 9 is an example map display of various clusters in accordance with some embodiments. In various embodiments, clusters of similar activities have already been determined using a process such as process 400 of FIG. 4 and data has been stored for each cluster using a process such as process 700 of FIG. 7. The example of FIG. 9 is an example presentation at a user interface that may be presented in response to a user request to view data associated with clusters. Left panel 902 shows information for the top clusters associated with the currently selected region of the San Francisco Bay Area. Left panel 902 includes the number of activities associated with each cluster under the "#" column, the average distance of the activities in a cluster, and a list of names of clusters of activities under the "Name" column. Left panel 902 also includes various interactive filter elements that a user may select to filter out clusters associated with certain attributes. For example, left panel 902 includes a distance bounds bar that allows a user to adjust the average distance associated with clusters of interest. Left panel 902 includes a selection of a particular activity type based on their respective icons to allow a user to identify a particular activity type associated with clusters of interest. Left panel 902 includes a selection of a particular type of time recurrence (e.g., any, yearly, weekly) to allow a user to identify clusters of interest with activities that are associated with a particular type of recurrence. For example, those clusters that meet the criteria determined by the filters of left panel 902 may also be listed in left panel 902.

The map in FIG. 9 shows representative GPS data associated with at least some of the clusters that are named in left panel 902. The currently selected cluster is the cluster named "hawk hill sunrise" and the map in FIG. 9 highlights the representative GPS data associated with the "hawk hill sunrise" cluster. In the example of FIG. 9, the representative GPS data associated with a cluster comprises the recorded GPS data associated with a subset (e.g., 20) of activities that are included in a cluster. As such, various different sets of GPS data with similarities/overlapping portions are highlighted on the map to represent the general route associated with the "hawk hill sunrise" cluster. In addition to showing the representative GPS data associated with the selected "hawk hill sunrise" cluster, window 904 shows additional information associated with the selected "hawk hill sunrise" cluster. In the example of FIG. 9, window 904 shows other names determined for the cluster (e.g., "rainy hawk," "afternoon hawk," "hhx3," etc.), the number of activities ("8915") that are included in the cluster and their average distance ("26 km"), a histogram of the occurrence of the cluster's activities across Monday through Sunday, a histogram of times through a day at which the cluster's activities take place, and a histogram of months of the year (January through December) during which the cluster's activities take place. Window 904 further shows photos that have been aggregated for the selected "hawk hill sunrise" cluster. For example, the photos may have been submitted by users for each individual activity that was found to belong to the "hawk hill sunrise" cluster.

For example, in an example experiment, a set of 230 million activities representing all activities from a year (e.g., 2015) was obtained. An Apache Spark® cluster of about 500 CPUs was used to cluster the obtained activities. The clustering of such activities took about a day and resulted in approximately 1 million clusters, each with more than 10 activities. The largest cluster has approximately 100,000 activities.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
   a processor; and
   a memory coupled to the processor and configured to provide the processor with instructions which when executed cause the processor to:
   receive a plurality of activities, wherein each activity included in the plurality of activities includes a stream of GPS data points recorded using a GPS recording device;
   determine a cluster of similar activities from the plurality of activities, wherein to determine the cluster of similar activities comprises to:
   generate a first plurality of reduced activities by reducing the plurality of activities using a first distance parameter;
   determine a first set of clusters of activities from the plurality of activities by performing pairwise comparisons among corresponding GPS data points in each pair of activities of the first plurality of reduced activities;
   generate a second plurality of reduced activities by reducing the plurality of activities using a second distance parameter, wherein the second distance parameter enables less reduction than the first distance parameter; and
   generate a second set of clusters of activities from the first set of clusters of activities by performing pairwise comparisons among GPS data points of a respective portion of the second plurality of reduced activities belonging to each of at least a subset of the first set of clusters of activities; and
   generate a map display for the cluster of similar activities;
   wherein reducing the plurality of activities using the first distance parameter and the second distance parameter comprises removing GPS data points from each activity based at least in part on the first distance parameter and the second distance parameter, respectively.

2. The system of claim 1, wherein the processor is further configured to divide the plurality of activities into a plurality of shards, wherein a shard comprises a corresponding subset of the plurality of activities, wherein the plurality of shards corresponds to respective ones of a plurality of geographic areas.

3. The system of claim 1, wherein to determine the first set of clusters of activities from the plurality of activities by performing pairwise comparisons among corresponding GPS data points in each pair of activities of the first plurality of reduced activities comprises to:
   determine a pairwise correlation value between a first reduced activity and a second reduced activity from the first plurality of reduced activities; and
   divide the plurality of activities into one or more clusters of similar activities based at least in part on corresponding pairwise correlation values associated with corresponding pairs of activities from the first plurality of reduced activities.

4. The system of claim 1, wherein to determine the first set of clusters of activities from the plurality of activities by performing pairwise comparisons among corresponding GPS data points in each pair of activities of the first plurality of reduced activities comprises to:
   determine a mapping between a first reduced activity and a second reduced activity from the plurality of activities, wherein the mapping comprises a plurality of pairs of corresponding GPS data points between at least a subset of GPS data points associated with the first reduced activity and at least a subset of GPS data points associated with the second reduced activity;
   determine a pairwise correlation value between the first reduced activity and the second reduced activity based at least in part on the mapping between the first reduced activity and the second reduced activity; and
   divide the plurality of activities into one or more clusters of similar activities based at least in part on corresponding pairwise correlation values associated with corresponding pairs of activities from the first plurality of reduced activities.

5. The system of claim 1, wherein to determine the first set of clusters of activities from the plurality of activities by performing pairwise comparisons among corresponding GPS data points in each pair of activities of the first plurality of reduced activities comprises to:
   determine a pairwise correlation value between a first reduced activity and a second reduced activity from the first plurality of reduced activities;
   divide the plurality of activities into one or more clusters of similar activities based at least in part on corresponding pairwise correlation values associated with corresponding pairs of activities from the first plurality of reduced activities;
   determine that a first cluster and a second cluster of the one or more clusters of similar activities are similar; and
   merge the first cluster and the second cluster into a third cluster of similar activities.

6. The system of claim 1, wherein to generate the map display for the cluster of similar activities comprises to present a set of representative GPS data associated with the cluster of similar activities at a map, wherein the set of representative GPS data associated with the cluster of similar activities is determined based at least in part on at least a portion of GPS data recorded for activities that are included in the cluster of similar activities.

7. The system of claim 1, wherein the processor is further configured to determine a name associated with the cluster of similar activities based at least in part on analyzing titles of activities that are included in the cluster of similar activities.

8. The system of claim 1, wherein the processor is further configured to determine a time distribution associated with when activities that are included in the cluster of similar activities occurred.

9. The system of claim 1, wherein the processor is further configured to determine a recurrence pattern associated with when activities that are included in the cluster of similar activities occurred.

10. The system of claim 1, wherein the processor is further configured to determine a median or average distance associated with activities that are included in the cluster of similar activities.

11. A method, comprising:
    receiving a plurality of activities, wherein each activity included in the plurality of activities includes a stream of GPS data points recorded using a GPS recording device;
    determining a cluster of similar activities from the plurality of activities, wherein determining the cluster of similar activities comprises:
generating a first plurality of reduced activities by reducing the plurality of activities using a first distance parameter;
determining a first set of clusters of activities from the plurality of activities by performing pairwise comparisons among corresponding GPS data points in each pair of activities of the first plurality of reduced activities;
generating a second plurality of reduced activities by reducing the plurality of activities using a second distance parameter, wherein the second distance parameter enables less reduction than the first distance parameter; and
generating a second set of clusters of activities from the first set of clusters of activities by performing pairwise comparisons among GPS data points of a respective portion of the second plurality of reduced activities belonging to each of at least a subset of the first set of clusters of activities; and
generating a map display for the cluster of similar activities;
wherein reducing the plurality of activities using the first distance parameter and the second distance parameter comprises removing GPS data points from each activity based at least in part on the first distance parameter and the second distance parameter, respectively.

12. The method of claim 11, wherein determining the first set of clusters of activities from the plurality of activities by performing pairwise comparisons among corresponding GPS data points in each pair of activities of the first plurality of reduced activities comprises:
determining a pairwise correlation value between a first reduced activity and a second reduced activity from the first plurality of reduced activities; and
dividing the plurality of activities into one or more clusters of similar activities based at least in part on corresponding pairwise correlation values associated with corresponding pairs of activities from the first plurality of reduced activities.

13. The method of claim 11, wherein determining the first set of clusters of activities from the plurality of activities by performing pairwise comparisons among corresponding GPS data points in each pair of activities of the first plurality of reduced activities comprises:
determining a mapping between a first reduced activity and a second reduced activity from the plurality of activities, wherein the mapping comprises a plurality of pairs of corresponding GPS data points between at least a subset of GPS data points associated with the first reduced activity and at least a subset of GPS data points associated with the second reduced activity;
determining a pairwise correlation value between the first reduced activity and the second reduced activity based at least in part on the mapping between the first reduced activity and the second reduced activity; and
dividing the plurality of activities into one or more clusters of similar activities based at least in part on corresponding pairwise correlation values associated with corresponding pairs of activities from the first plurality of reduced activities.

14. The method of claim 11, wherein determining the first set of clusters of activities from the plurality of activities by performing pairwise comparisons among corresponding GPS data points in each pair of activities of the first plurality of reduced activities comprises:
determining a pairwise correlation value between a first reduced activity and a second reduced activity from the first plurality of reduced activities;
dividing the plurality of activities into one or more clusters of similar activities based at least in part on corresponding pairwise correlation values associated with corresponding pairs of activities from the first plurality of reduced activities;
determining that a first cluster and a second cluster of the one or more clusters of similar activities are similar; and
merging the first cluster and the second cluster into a third cluster of similar activities.

15. The method of claim 11, further comprising determining a recurrence pattern associated with when activities that are included in the cluster of similar activities occurred.

16. A computer program product, the computer program product comprising a non-transitory computer readable storage medium and comprising computer instructions for:
receiving a plurality of activities, wherein each activity included in the plurality of activities includes a stream of GPS data points recorded using a GPS recording device;
determining a cluster of similar activities from the plurality of activities, wherein determining the cluster of similar activities comprises:
generating a first plurality of reduced activities by reducing the plurality of activities using a first distance parameter;
determining a first set of clusters of activities from the plurality of activities by performing pairwise comparisons among corresponding GPS data points in each pair of activities of the first plurality of reduced activities;
generating a second plurality of reduced activities by reducing the plurality of activities using a second distance parameter, wherein the second distance parameter enables less reduction than the first distance parameter; and
generating a second set of clusters of activities from the first set of clusters of activities by performing pairwise comparisons among the GPS data points of a respective portion of the second plurality of reduced activities belonging to each of at least a subset of the first set of clusters of activities; and
generating a map display for the cluster of similar activities;
wherein reducing the plurality of activities using the first distance parameter and the second distance parameter comprises removing GPS data points from each activity based at least in part on the first distance parameter and the second distance parameter, respectively.

17. A system, comprising:
a processor; and
a memory coupled to the processor and configured to provide the processor with instructions which when executed cause the processor to:
receive a user query including a set of cluster criteria, wherein the set of cluster criteria includes an activity type;
determine one or more clusters of similar activities that match the set of cluster criteria based on GPS data for each of the one or more clusters of similar activities, wherein each activity of a cluster of similar activities includes a stream of GPS data points recorded using a GPS recording device, wherein to determine the one or more clusters of similar activities comprises to:

generate a first plurality of reduced activities by reducing a plurality of activities using a first distance parameter;

determine a first set of clusters of activities from the plurality of activities by performing pairwise comparisons among corresponding GPS data points in each pair of activities of the first plurality of reduced activities;

generate a second plurality of reduced activities by reducing the plurality of activities using a second distance parameter, wherein the second distance parameter enables less reduction than the first distance parameter; and generate a second set of clusters of activities from the first set of clusters of activities by performing pairwise comparisons among GPS data points of a respective portion of the second plurality of reduced activities belonging to each of at least a subset of the first set of clusters of activities; and generate a map display for the one or more clusters of similar activities;

wherein reducing the plurality of activities using the first distance parameter and the second distance parameter comprises removing GPS data points from each activity based at least in part on the first distance parameter and the second distance parameter, respectively.

18. The system of claim 17, wherein to determine the one or more clusters of similar activities that match the set of cluster criteria comprises to compare the set of cluster criteria to metadata stored for the one or more clusters of similar activities.

19. The system of claim 17, wherein the set of cluster criteria comprises an average distance, a geographic region, and a recurrence pattern.

20. The system of claim 17, wherein to generate the map display for the one or more clusters of similar activities comprises to present sets of representative GPS data corresponding to respective ones of the one or more clusters of similar activities at a map, wherein the sets of representative GPS data corresponding to respective ones of the one or more clusters of similar activities are determined based at least in part on at least a portion of GPS data recorded for activities that are included in the one or more clusters of similar activities.

* * * * *